United States Patent [19]

Haenel et al.

[11] Patent Number: 4,755,880
[45] Date of Patent: Jul. 5, 1988

[54] CAMERA FOR OPTO-ELECTRONICALLY SCANNING ANY DESIRED SCENE

[75] Inventors: Steffen Haenel; Stefan Thomalsky, both of Munich, Fed. Rep. of Germany

[73] Assignee: Gesellschaft für Strahlen- und Umweltforschung mbH, Neuherberg, Fed. Rep. of Germany

[21] Appl. No.: 1,219

[22] Filed: Jan. 7, 1987

[30] Foreign Application Priority Data

Mar. 1, 1986 [DE] Fed. Rep. of Germany ....... 3606765

[51] Int. Cl.$^4$ ...................... H04N 1/024; H04N 1/028
[52] U.S. Cl. ................................. 358/213.11; 358/294
[58] Field of Search ........... 250/578; 358/294, 213.11, 358/213.13, 293

[56] References Cited

U.S. PATENT DOCUMENTS 4,682,242 7/1987 Sugita .................................. 358/293

FOREIGN PATENT DOCUMENTS 0124098 4/1983 European Pat. Off. .
0131814 6/1984 European Pat. Off. .
134031 12/1977 Fed. Rep. of Germany .
3433684 9/1983 Fed. Rep. of Germany .

OTHER PUBLICATIONS

Brochure No. 500/10M/5-84 of Eikonix Corporation, Bedford, Mass.

Primary Examiner—Jin F. Ng
Assistant Examiner—Stephen Brinich
Attorney, Agent, or Firm—Spencer & Frank

[57] ABSTRACT

Camera for opto-electronic scanning of any desired scene which is projected along a primary optical beam path onto a planar image field of the camera. A line image sensor having a plurality of sensor elements arranged in a line, and an auxiliary image sensor comprising a plurality of sensor elements having the form of an area array, are mounted on a carrier of a first moving means which displaces the line image sensor together with the area image sensor through the planar image field of the camera and perpendicularly to the direction of the sensor line.

14 Claims, 2 Drawing Sheets

CAMERA FOR OPTO-ELECTRONICALLY SCANNING ANY DESIRED SCENE

BACKGROUND OF THE INVENTION

The present invention relates to a camera for opto-electronically scanning any desired scene, wherein the camera includes: (a) a line image sensor which is displaceable through an image field of a scene located in the major opto-electronic beam path and perpendicularly to the line direction of the sensor; and (b) a moving device including a carrier for displacing the line image sensor.

The fields of use for such a camera include image transmission, image processing and image evaluation, with such uses being limited most of the time to static scenes whose content does not change during the scanning time, i.e. over a period of a few seconds. Line image sensors and area image sensors are commercially available as integrated semiconductor components for use in electronic cameras.

In a known electronic camera disclosed in East German Pat. No. 134,031, a mechanical device for moving a line image sensor is composed of a movable carrier on which the line image sensor is fastened, a guide for the carrier which assures accurate tracking of the line image sensor across the image field, and a gear assembly including a drive for synchronously moving the carrier. The carrier and its guide are composed, for example, of a micro roll table with a circuit board mounted thereon, the gear assembly being in the form of a precision spindle and spindle nut, with the drive being a stepping motor.

Such a microroll table (type ND) has been described, e.g., on page 50 of the leaflet "Walzführungen" (issue 100a/06, 1985) by Schneeberger GmbH Maschinenfabrik, Graefenau, Germany.

Alternatively, it is also known to use a metal band drive, as disclosed for example in European Pat. No. 0,131,814, for moving the line image sensor.

The moving device assures a certain longitudinal displacement of the carrier over a given displacement range which is generally limited by end switches at the ends of the displacement range.

Image sensors contain photosensitive solid state devices which in a line image sensor are arranged along a line, whereas in an area image sensor the configuration is two-dimensional on an area.

Line image sensors and area image sensors are described as examples in a leaflet entitled "Optoelektronics Data Book 1984", pp. 2-29 to 2-40 (line image sensor TC 103) and pp. 2-53 to 2-54 (area image sensor TC 102/202), published by Texas Instruments Deutschland GmbH.

According to this leaflet the line image sensor contains 2048 photosensitive elements with a distance of the centerlines of nearly 12.7 $\mu$m so that the length of the sensor is nearly 26 mm.

The area image sensor (TC 202) contains 292 lines with 390 photosensitive elements each, the aspect ratio of the entire sensor area being 4 to 3 and the image diagonal 11 mm long.

Accordingly, the horizontal and vertical centerline distances of the photosensitive elements are about 22.5 $\mu$m.

While it is possible to manufacture a line image sensor to include several thousand sensor elements, the number of sensor elements per edge of an area image sensor is limited, for technological reasons, to several hundred. Since the sensor element dimensions generally are comparable in both types of sensors, an associated image field for the area image sensor is significantly smaller than for the line image sensor and the area image sensor has a much poorer geometric resolution for an associated image field. The two edge dimensions of a field to be reproduced and scanned by a line image sensor correspond, inter alia, to the length of the line image sensor and the length of the displacement range. Such a field to be reproduced is called an image field.

Hereinforth a line scan image sensor is called a line sensor, and an area image sensor is called an area sensor respectively.

German Offenlegungsschrift (laid-open patent application) No. 3,433,684 discloses an apparatus for generating digital image information. The imaging beam path of this device is directed into two mutually perpendicular directions by means of a pivotal mirror. In the first position of the pivotal mirror, a primary beam path is produced in which the image field is disposed in the plane of movement and in the displacement range of the line sensor. In the second position of the pivotal mirror, a view finder beam path reproduces the image field on a ground observation glass.

This device has the characteristics of ground glass observation via a deflection mirror as known from the prior art reflex photography, namely: (1) brightness and contrast of the ground glass image are a function of the field of the scene; and (2) the ground glass image has dimensions in the range of centimeters, requiring observation through a magnifying glass, with lateral inversion of the image. In the intended special application of the described device for the transmission of transparent master images with adjustable illumination, these characteristics are not necessarily a drawback but they make universal application of such a device for scanning any desired scenes more difficult.

European Pat. No. 0,124,098 discloses an image scanner having a mechanically movable line sensor. An image frame is optically reproduces by means of a projector which projects light onto a document to be scanned. The image frame permits correct positioning, size adjustment and focusing. The projector is composed of an intense light source, a slide for the image frame embedded in optical components to block out heat and concentrate the light, with the slide being disposed in the plane of the image field next to the linear array on the carrier. For this purpose, the carrier has been made longer in length.

The moving device here has an extended displacement range, i.e. the guide and the spindle, in particular, have been extended so that, at one time, the slide containing the above-mentioned optical components is positioned entirely in the image field and, at another time, the linear array scans the image field, thus providing a parallax-free common beam path for scanning and projection.

Although such a device avoids the drawbacks of ground glass oberservation, it is usable only for scanning reflected images or documents, respectively. Another drawback is the development of intense heat by the projector in the immediate vicinity of the line sensor.

In East German Pat. No. 134,031, mentioned above, the imaging camera has a mechanically movable line sensor and an area sensor in which two separate image fields are produced by a beam dividing mirror for the line sensor and for the area sensor and the area sensor is connected with a monitor by means of a video circuit and thus constitutes an electronic view finder. The necessary image field reduction for the area array is here effected in a known manner via an intermediate image, a light concentrating Fresnel lens and an additional lens.

The possibility of observing the field of the scene even with low light, with low contrast, with a visually unfavorable spectral range and with a difficultly accessible or remote camera location are advantages of the described camera, but a drawback inherent in it is that the low geometric resolution of the area sensor, although permitting image field setting, makes precise focusing more difficult.

It is also known to equip an electronic camera with a device for scanning in selective spectral regions. For example, the brochure No. 500/10M/5-84 of EIKO-NIX Corporation, Bedford, Massachusetts, depicts an electronic camera having a mechanically movable line sensor and a ground glass view finder, containing a filter wheel with various filters. These filters are selectively inserted into the beam path by rotating the filter wheel by means of a controllable drive.

An electronic camera which is intended for scanning of any desired scene is generally equipped with a connecting device for exchangeable photographic lenses.

The controllable components of such an electronic camera, for example, the moving device, the pivotal mirror drive and the filter wheel drive as well as the operating circuit for the line sensor are connected with a control unit via interface circuits to coordinate the functions of the individual components. The line sensor is also connected via video and analog/digital circuits, with an image transmitting or image processing device. Generally, the control unit and the image processing unit are realized in a digital computer.

Operating and video circuits for line sensors or area sensors are commercially available. For instance, Thomson-CSF, Boulogne-Billancourt, France, describes this type of circuit in a leaflet entitled "Electronic Modules for Charge-coupled Devices", April 1984. Also in the brochure mentioned before of Texas Instruments Deutschland GmbH such modules are described on pp. 2-55 to 2-58.

Operating circuits for moving devices are commercially available. For example, the brochure PKS Digiplan Ansteuerund Positioniergeräte fur Schrittmotoren of BAUTZ, Weiterstadt-Darmstadt, Germany, depicts at page 6 and 7 an operating circuit for stepper motors (SD 2/3).

SUMMARY OF THE INVENTION

It is an object of the present invention to design an electronic camera of the type discussed above for scanning of any desired scene so that view finding or focusing of the scene is simplified.

The above and other objects are accomplished according to the invention by the provision of an arrangement in a camera for opto-electronic scanning of any desired scene which is projected along a primary optical beam path onto a planar image field of the camera, the arrangement including a line sensor having a plurality of photosensitive elements arranged in a line; an area sensor which includes a plurality of photosensitive elements and has the form of an area array (hereinforth called auxiliary sensor) and first moving means, including a carrier supporting the line sensor and the auxiliary sensor, for displacing the line sensor together with the auxiliary sensor through the planar image field of the camera and perpendicularly to the direction of the sensor line.

According to the invention, an area sensor is thus applied on the carrier of the moving device in the plane of the image field next to the line sensor when seen in the direction of movement. During a first time interval, the carrier is disposed in a first portion of the displacement range and thus the auxiliary sensor is positioned in the image field, preferably in the center of the image field. During a second time interval, the carrier is disposed in a second portion of the displacement range and the carrier, as well as the line sensor, sequentially assume the line positions they are to scan in the image field.

The dimensions of the individual sensor elements of the line sensor and the auxiliary sensor are preferably comparable to one another; likewise, the center-to-center spacings between adjacent sensor elements in the line sensor and the auxiliary sensor are preferably comparable.

The carrier may be provided with an adjustment device for aligning the scanning plane of the line sensor and the auxiliary sensor to coincide in the image field. The auxiliary sensor serves to precisely focus the camera in that a section of the image field is observable on a monitor with high geometric resolution which approximately corresponds to the resolution of the line sensor.

Preferably, the electronic camera is equipped with an electronic view finder including an area sensor (hereinforth called view finder sensor) and monitor, with a reducing ancillary beam path from a reflecting surface (hereinforth called first reflecting surface), an intermediate image, a light concentrating lens and an additional lens, with the view finder sensor being fixed in the reduced image field of the ancillary beam path.

BRIEF DESCRIPTION OF THE INVENTION

The invention will be described in greater detail below with reference to the accompanying drawings wherein.

DESCRIPTION OF THE PREFERRED EMBODIMENTS

Figure 1:
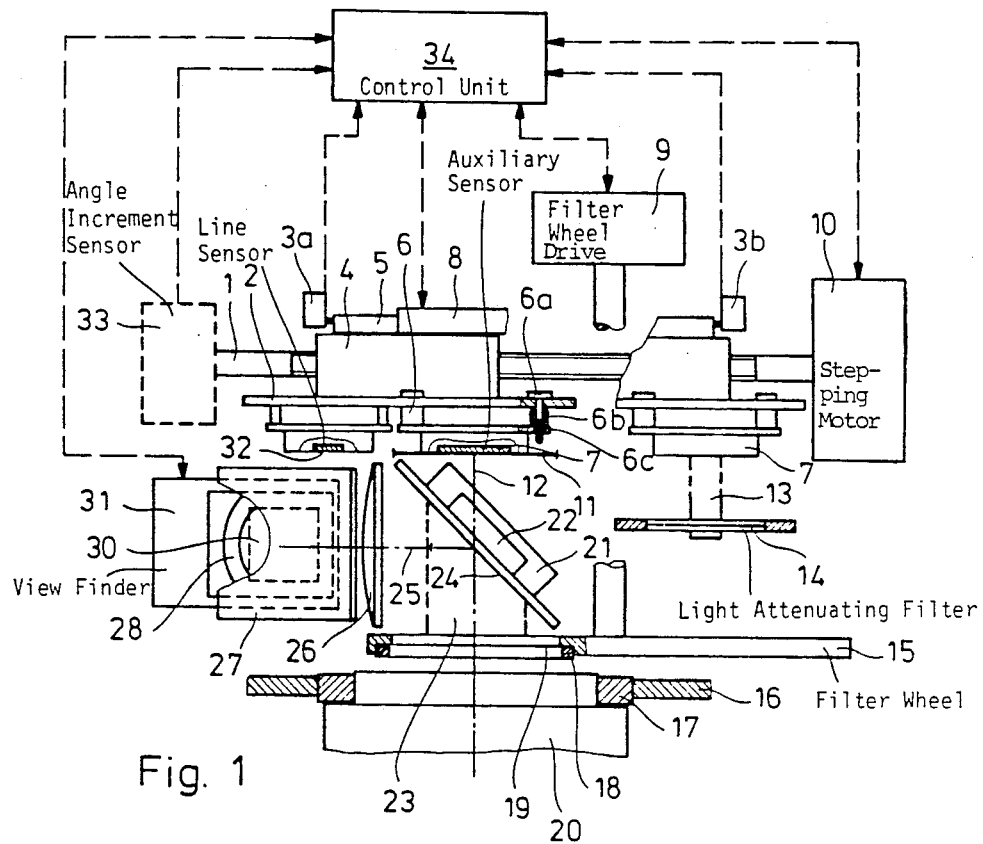
FIG. 1 is a side elevational view in partial cross section of one embodiment of an electronic camera according to the invention.

Referring to FIG. 1, there is shown a camera having a front wall 16 in which a lens connecting device 17 is attached for mounting an exchangeable lens 20.

Within the camera there is provided a first moving device composed of a spindle 1 having a spindle nut 4 driven by a stepping motor 10. On spindle nut 4, there is disposed a carrier in the form of a tongue 5 of a micro roll table and a plate 2 for receiving a line sensor 32 and an auxiliary sensor 7, the latter being in the form of an area sensor. An adjustment device 6 serves to align the scanning planes for line sensor 32 and auxiliary sensor 7 to be precisely coincident in focus.

The adjustment device 6 consists of a screw 6a guided in a cylindrical opening of the plate 2 and in an internal thread of the guide plate 6c. The guide plate 6c supports the auxiliary sensor 7.

On the shaft of the screw 6a a pressure spring 6b has been provided between the plate 2 and the guide plate 6c.

The adjustment device 6 consists of three screws of the type 6a with pressure springs 6b in a triangular arrangement.

The orientation of the auxiliary sensor 7 in the image plane 11 is achieved by turning the screws 6a with a tool while observing at the same time the sharpness of a test image on the monitor 44.

Guide 8 is a component of the micro roll table. Two end switches 3a and 3b are actuated by tongue 5 and each put out a signal if the carrier is in one of the end positions.

In a preferred embodiment, an angle increment sensor 33 may be disposed on spindle 1 for measuring the starting position on the first moving device. An angle increment sensor (type HEDS-5000 series) is described, e.g., in the folder entitled "Two and Three Channel Incremental Optical Encoder Kit", 1/1984 of Hewlett Packard, Palo Alto, Ca.

FIG. 1 shows the left end position of tongue 5 at end switch 3a where auxiliary sensor 7 is in the major beam path 12 in the center of image field 11. FIG. 1 also shows, in fragmentary form, the right end position at end switch 3b, when the auxiliary sensor 7 is disposed outside the major beam path 12. In this position line sensor 32 would be finished scanning image field 11 and would be disposed at the right edge of image field 11 (not shown in FIG. 1).

A light attenuating filter 14 may be fastened on plate 2 upstream of auxiliary sensor 7 in a mount 13 as shown in the fragmentary view at the right end position of tongue 5 in FIG. 1.

A filter wheel 15 is disposed immediately downstream of lens connecting device 17. A plurality of filters 19 are fastened in respective mounts 18 which are supported by filter wheel 15 (see FIG. 2).

The respectively used filter 19 is concentrically pivoted into primary beam path 12. If the exchangeable lens 20 is removed, mount 18 and filter 19 are accessible from the outside of the camera through an opening in connecting device 17.

Figure 2:
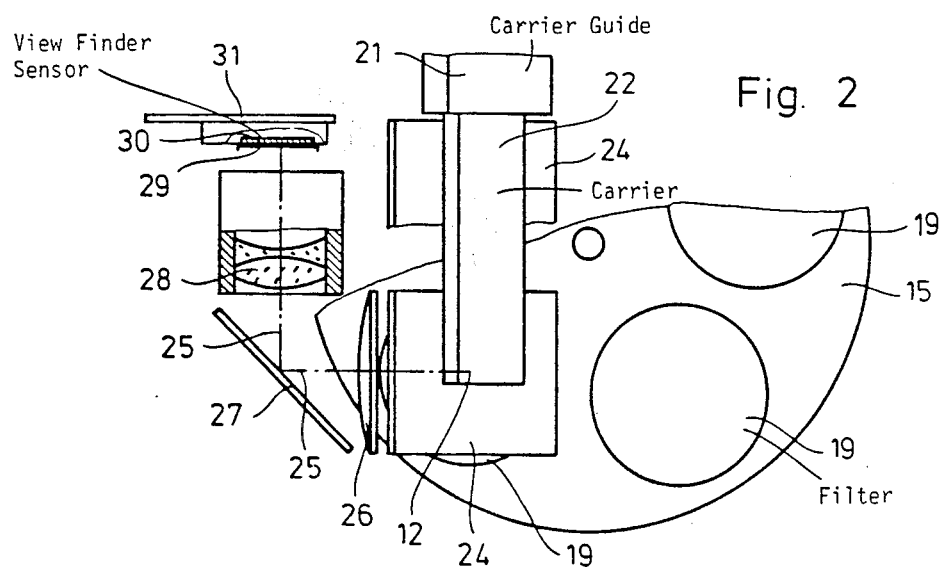
FIG. 2 is a partial top view of FIG. 1 illustrating the ancillary beam path.

A first mirror 24 is disposed on a carrier 22 mounted in a guide 21, i.e. on a micro roll table equipped with a controllable drive 42, 43 (not shown in FIG. 1). The position of the first mirror 24, depends on the functional state of the camera, i.e. as shown in FIG. 2 mirror 24 is either within primary beam path 12 or outside of the primary beam path 12 (the latter position being indicated by the fragmentary view of mirror 24 in FIG. 2).

In a further embodiment, first mirror 24 may be disposed in a mount 23 (shown in dotted lines in FIG. 1) fastened to filter wheel 15 at the location of an opening for one of the filters 19.

First mirror 24 produces a deflected ancillary beam path 25 for a view finder sensor 30. View finder sensor 30 is likewise an area sensor.

The ancillary beam path 25 is produced by way of a light focusing Fresnel lens 26, a deflecting mirror 27, which produces a true-to-side view finder image 29 and an additional lens 28 which produces a reduced image. The view finder sensor 30 is mounted on a fixed carrier 31.

A monitor, control unit, image processing unit, operating and video circuits and electrical lines within and outside the camera are symbolized jointly by a control unit 34 whose interactions with the individual components are identified by arrows in FIG. 1.

First mirror 24, which constitutes a first reflecting surface is thus disposed on a second moving device which may comprise a micro roll table including carrier 22, as described above, or the filter wheel 15. First mirror 24 is disposed, in a first position of carrier 22, completely outside the primary beam path 12 and, in a second position of carrier 22, completely within the primary beam path 12.

Second mirror 27, which constitutes a second reflecting surface, is disposed in the view finder beam path 25 between the intermediate image formed on upstream surface of the fresnel lens 26 and the view finder sensor 30, preferably between the Fresnel lens 26 and an additional lens 28. Second mirror 27 thus produces the image field 29 on the view finder sensor 30 with the sides of the image in the correct position (i.e. true-to-side).

In a preferred embodiment, view finder sensor 30 and auxiliary sensor 7 are connected with the same monitor 44 via a video duplex circuit 45, with a circuit for electronic equalization 48 of the different illumination intensities of the two area sensors. The second moving device 42, 43 and the switching component of the video duplex circuit 45 are connected with control unit 34.

In the further embodiment in which first mirror 24 and mount 23 are mounted as an attached component at the location of a filter opening in filter wheel 15 which is built into the camera, the reflecting surface of mirror 24 lies completely in the primary beam path 12 if filter wheel 15 is rotated into a predetermined position. Filter wheel is then takes over the function of the second moving device.

First mirror 24 may be replaced by a known pivotal mirror with associated pivot drive or by a known fixed, partially transmitting beam dividing mirror in a manner understood by those skilled in the art.

To equalize the illumination intensity of auxiliary sensor 7 and view finder sensor 30, light attenuating filter 14 and its mount 13, which is fastened to carrier 4 of the first moving device, may be inserted upstream of auxiliary sensor 7.

Filter wheel 15 is designed so that a removable mount 19 for each individual filter 19 is disposed on the side of wheel 15 facing lens 20. The exterior dimensions of mount 18 are less than the inner diameter of the lens connecting device 17. Each individual filter 19 also has these external dimensions. In this embodiment, filters 19 are accessible from outside the camera through the lens connecting device 17 and can be exchanged when worn or for special spectrometric requirements.

As already mentioned, an angle increment sensor 33, which is connected with control unit 34, is disposed on spindle 1 of the first moving device. At a certain angular position, sensor 33 produces an electrical pulse and thus permits, in cooperation with one of the end switches 3a, 3b, very precise fixing of the starting position for scanning of an image field by line sensor 32.

Instead of view finder sensor 30 and additional lens 28, a simplified embodiment may include a magnifying observation glass for visual true-to-side observation of the intermediate image.

The following functions can be performed by the camera. Control unit 34 puts the electronic camera into the state of viewfinder function.

For this purpose, the second moving device, comprised of either carrier 22 and guide 21 in one embodiment or filter wheel 15 in another embodiment, brings the first reflecting surface 24 into the primary beam path 12. By deflection at a right angle, ancillary beam path 25 is produced. Viewfinder sensor 30 is connected with a monitor 44 by switching a video duplex circuit 45 and an image of the scene appears on the monitor's screen 44. A user sets brightness and contrast on the monitor 44 to an optimum setting by manual tuning so that even if the scene brightness is unfavorable or the spectral range is visually unfavorable, comfortable observation is assured. Various camera settings, for example, viewing a particular part of a scene, imaging scale and rough focusing, are made on the basis of the display on the monitor's screen 44.

If control unit 34 now indicates that fine focusing is taking place, the second moving device 43 removes the first reflecting mirror 24 from the primary beam path 12 and the monitor 44 is connected, via the video duplex circuit 45, with the auxiliary sensor 7. By means of the first moving device spindle 1, spindle nut 4, and stepping motor 10, auxiliary sensor 7 is transported into the image field 11 of the primary beam path 12. Fine focusing then takes place with the aid of the image section covered by auxiliary sensor 7 and the patterns disposed in this image section, which are visible on the monitor's screen 44 with high geometric resolution. Further image sections may be selected in the direction of movement of spindle nut 4, if necessary.

The described functions can be selectively repeated individually or alternatingly.

After performing all settings, control unit 34 puts the electronic camera into the state of scanning. If necessary, a previously selected filter 19 is pivoted into primary beam path 12 by actuating filter wheel 15. For this purpose, control unit 34 activates filter wheel drive 9. Then, control unit 34, by means of the first moving device brings line sensor 32 over image field 11, thus scanning image field 11 with high geometric resolution and transmitting the image digitally to the image processor 36 within control unit 34. If necessary, this scanning is repeated after a further filter 19 has been pivoted into position in the primary beam path 12.

Figure 3:
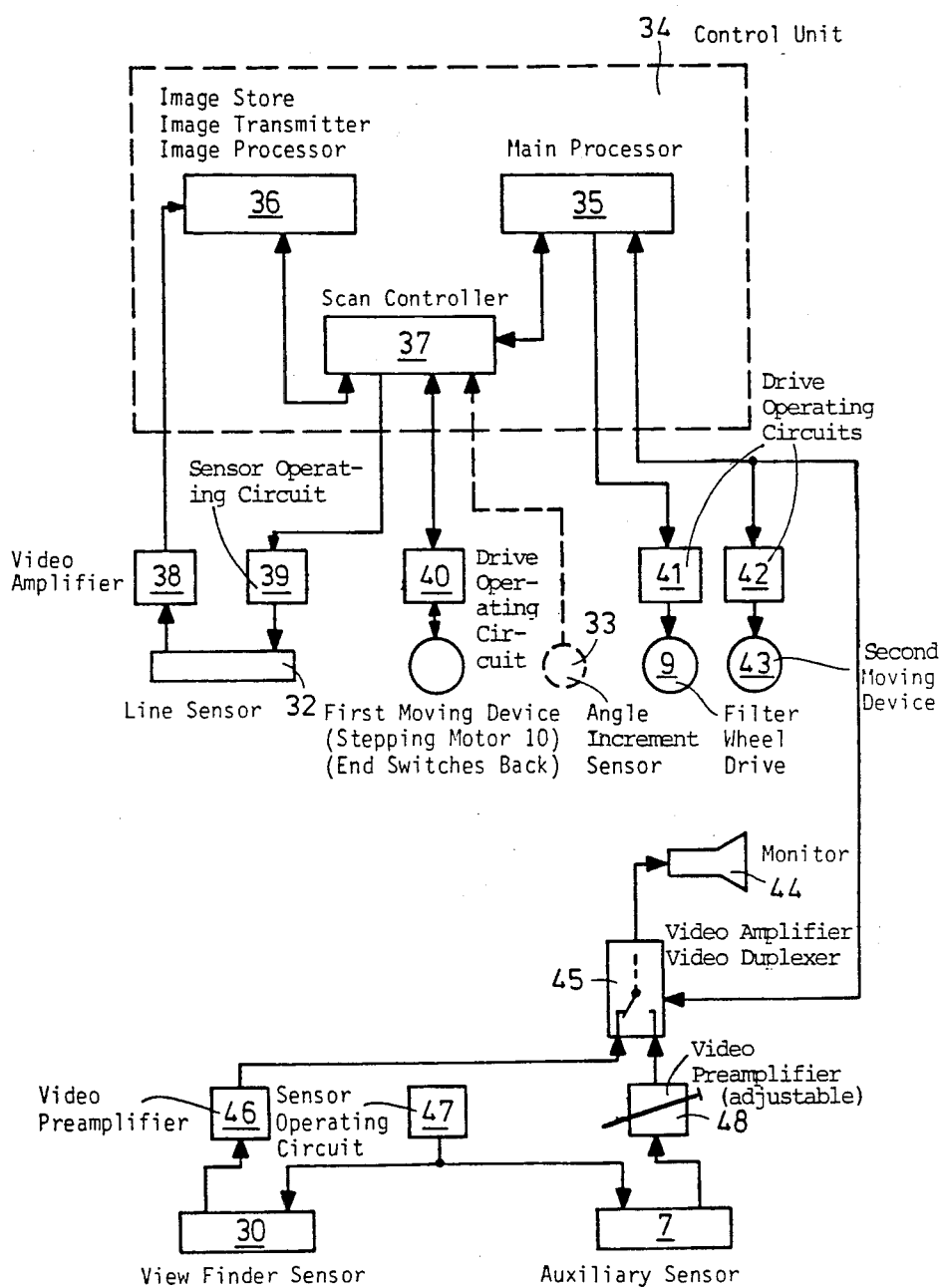
FIG. 3 is a block diagram of one embodiment of a control unit and connected controllable components of an electric camera according to the invention.

FIG. 3 shows a block diagram of the control unit 34 together with the controllable components of the camera.

The control unit 34 includes a main processor 35, an image processor (or depending on the specific application, a visual storage or an image transmitting device) 36 and a scanning control unit 37.

These components may be implemented together as a digital computer 34.

The main processor controls the general operating condition of the camera as already described before: the start of the observation functions (view finder function, fine focusing) or filter replacement or line scanning. For this purpose, the main processor is connected with the scan controller 37, the drive operating circuits 41, 42 and the video duplexer 45.

The scan controller 37 synchronizes the mechanical drive of the first moving device (stepping motor 10, end switches 3a, b) carrying the line sensor 32, with the inner electronic scanning of the line sensor 32 and with the transmission of the image signals from the video amplifier 38 into the image processor 36. The scan controller 37 is connected for this purpose with the image processor 36, the sensor operating circuit 39, and the drive operating circuit 40.

In a purpose built version of the camera the scan controller 37 verifies the starting point of the first moving device with an angle increment sensor 33 connected to it.

It is intended to have the observation functions performed by the view finder sensor 30 and the auxiliary sensor 7.

The video duplexer 45 is an alteration switch of video signals with the video amplifier connected in series.

In the view finder function the view finder sensor 30 receives the image of the scene and transmits the image points to the monitor 44 via the associated video preamplifier 46 and the video duplexer 45 and video amplifier.

The video duplexer 45 for this purpose connects the video amplifier with the channel of the video preamplifier 46. Switchover is released by a switching signal from the main processor 35.

In the fine focusing function the auxiliary sensor 7 receives a section of the image field and transmits the image points to the monitor 44 via the associated video preamplifier 48 and the video duplexer 45. The video duplexer 45 for this purpose is in the other switching position. It is intended to compensate the different light intensities of the view finder sensor 30 and the auxiliary sensor 7 by adjustment of amplification in the video preamplifier 48.

The present disclosure relates to the subject matter disclosed in German Ser. No. P 36 06 765.2 of March 1st, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. An arrangement in a camera for opto-electronic scanning of any desired scene which is projected along a primary optical beam path onto a planar image field of the camera, said arrangement including:
   a line sensor having a plurality of photosensitive elements arranged in a line;
   an auxiliary sensor comprising a plurality of photosensitive elements and having the form of an area array; and
   first moving means including a carrier supporting said line sensor and said auxiliary sensor for displacing said line sensor together with said auxiliary sensor through the planar image field of the camera and perpendicularly to the direction of said line.

2. Arrangement as defined in claim 1, wherein said photosensitive elements of said line sensor and said auxiliary sensor have center-to-center dimensions which are approximately comparable.

3. Arrangement as defined in claim 1, and further comprising means, including a first reflecting surface, for producing an ancillary optical beam path from the primary optical beam path of the camera; and viewfinder means including a viewfinder sensor comprising a plurality of photosensitive elements and having the form of an area array, and disposed in the ancillary optical beam path for producing a reduced image of a scene projected along the primary optical beam path.

4. Arrangement as defined in claim 1, and further comprising a filter wheel and optical filters supported by said filter wheel, said filter wheel being movable for pivoting said optical filters, respectively, into the primary optical beam path.

5. Arrangement as defined in claim 3, and wherein said viewfinder means includes a monitor; and further comprising control means and a video duplex circuit for connecting said auxiliary sensor with said monitor; said video duplex circuit being connected to said control means and being equipped with an electronic equalizing circuit for handling different illumination intensities of said auxiliary sensor and said viewfinder sensor.

6. Arrangement as defined in claim 8, and wherein both said viewfinder sensor and auxiliary sensor are connected with one and the same operating circuit, included in the said control means, and generating the operating pulses for the said sensors.

7. Arrangement as defined in claim 1, and further comprising a mechanical adjusting means disposed on said carrier for optically fine tuning the positions of said line sensor and auxiliary sensor.

8. Arrangement as defined in claim 3, wherein said first reflecting surface comprises a mirror; and further comprising a second moving means including a second carrier mounting said first reflecting surface and a guide for said second carrier, said second moving means being arranged for moving said mirror transverse to said primary optical beam path.

9. Arrangement as defined in claim 4, and further comprising mounting means for mounting said first reflecting surface means, said mounting means and said first reflecting surface being attached as a component on said filter wheel, wherein in a defined rotary position of said filter wheel, said first reflecting surface lies completely within said primary optical beam path.

10. Arrangement as defined in claim 3, and further comprising in the ancillary optical beam path a Fresnel lens between said first reflecting surface and an additional light focusing lens between said Fresnel lens and said viewfinder sensor.

11. Arrangement as defined in claim 10, and further comprising in the ancillary optical beam path a second reflecting surface between said Fresnel lens and said additional light focusing lens.

12. Arrangement as defined in claim 1, and further comprising a light attenuating filter and mounting means mounting said light attenuating filter disposed upstream of said auxiliary sensor, said mounting means being fastened on the carrier of said first moving means.

13. Arrangement as defined in claim 4, and further comprising a lens connecting device for connecting a lens to the camera, said lens connecting device having an opening with an inner diameter through which the primary optical beam path passes, and wherein said filter wheel has a plurality of removable mounts each for a respective one of said optical filters, each said mount being disposed on the side of said filter wheel facing said lens connecting device, and having external dimensions which are smaller than the inner diameter of said lens connecting device.

14. Arrangement as defined in claim 1, wherein said first moving means comprises a spindle; and further comprising an angle increment sensor disposed on said spindle for producing a signal indicating the displacement of said carrier; and a camera control unit connected to said angle increment sensor for receiving and utilizing said signal.

* * * * *